United States Patent [19]

Hanes et al.

[11] Patent Number: 5,356,225
[45] Date of Patent: Oct. 18, 1994

[54] AIR BEARING SYSTEM WITH LARGE STIFFNESS AND MINIMAL VIBRATION CHARCTERISTICS

[76] Inventors: Charles E. Hanes, 15042 Lakeside Dr., Sonora, Calif. 95370; Robert S. Smith, 1263 Emory St., San Jose, Calif. 95126

[21] Appl. No.: 170,441

[22] Filed: Dec. 20, 1993

Related U.S. Application Data

[63] Continuation-in-part of Ser. No. 943,497, Sep. 11, 1992, abandoned.

[51] Int. Cl.$^5$ .............................................. F16C 32/06
[52] U.S. Cl. .................................. 384/100; 384/114
[58] Field of Search .................... 384/99, 100, 12, 13, 384/107, 114, 118, 8

[56] References Cited

U.S. PATENT DOCUMENTS

| | | | |
|---|---|---|---|
| 3,555,865 | 1/1971 | Sebastian | 384/100 X |
| 3,772,296 | 3/1973 | Fox | 355/53 |
| 4,569,562 | 2/1986 | Sato et al. | 384/100 X |
| 4,643,592 | 2/1987 | Lewis et al. | 384/100 |
| 4,930,907 | 6/1990 | Smith | 384/118 |
| 5,066,197 | 11/1991 | Champagne | 384/100 X |

*Primary Examiner*—Thomas R. Hannon
*Attorney, Agent, or Firm*—Robert Samuel Smith

[57] ABSTRACT

A bearing system including one or more bearings for optimizing stiffness of each bearing which includes an individual regulator, pressure meter and flow meter to each bearing. The meters send instantaneous values of pressure an flow rate to a computer system which performs an algorithm using the values and computes target signal values for each individual bearing. These values are then transmitted to the respective pressure regulators. The pressures applied by the regulators are maximum values with which the bearing can operate without going into vibration. One algorithm that the computer uses is to compute an "impedance" value of the bearing which is defined to be P/S where P is the pressure measured by the pressure meter and S is the flow rate measured by the flowmeter. This approach assumes that the actual effective pressure in the bearing is at last proportional to the pressure measured at the meter. If Pm and Sm are the pressure and flow rate respectively when the bearing pressure is just below a value where the bearing starts to resonate, then the computer works toward maintaining the pressure P and flow rate S at values where P/S=Pm/Sm. In another embodiment, after load is applied at a location with respect to the bearing, the computer computes pressure in the various bearings depending on where the load is located and value of the load so that total force and moment on the bearings equals zero. The invention is applicable to bearings relying on hydrodynamic and hydrostatic forces.

26 Claims, 8 Drawing Sheets

AIR BEARING SYSTEM WITH LARGE STIFFNESS AND MINIMAL VIBRATION CHARCTERISTICS

CROSS REFERENCE TO PRIOR APPLICATIONS

This application is a continuation-in-part of prior application Ser. No. 07/943,497 filed Sep. 11, 1992 now abandoned for which priority is claimed.

BACKGROUND

1. Field of the Invention

This invention relates to hydrodynamic bearings and particularly to a system of bearings featuring design and control of fluid flow in the bearing that optimizes stiffness and anti-vibration characteristics particularly applicable but not limited to airbearings.

2. Prior Art and Information Disclosure Statement

Bearings using air as a fluid have been designed for a variety of applications where it is required to have very low "drag" (minimal friction), where high speed is involved that would otherwise cause a rise in temperature, or where it is required to maintain close precision. The typical design of an airbearing is one in which pressurized air is admitted through an orifice in the stator opening into the interior of the airbearing interface; the air then escapes through exits at the edges of the interface, after following a flow pattern established by grooves in the stator surfaces.

One type of airbearing is the journal airbearing which comprises a rotating member supported by a static member. The interface between the rotor and stator is pressurized to airbearing support of the rotor. Another type of airbearing is the slider bearing in which a yoke straddles a bar and the interface between the yoke and bar is pressurized to provide airbearing support of the slider.

Both the journal and slider bearings rely on hydrodynamic pressure in the interface generated by flow of air through the interface. By hydrodynamic pressure is meant the pressure that is generated by virtue of the viscous nature of the lubricant. It will therefore be understood that the scope of this invention includes liquid and gaseous lubricants since both types of lubricants are characterized by a coefficient of viscosity.

In the context of this specification, the term hydrodynamic bearing may be taken to mean a bearing lubricated by either liquid or gas.

Two major problems characterize the journal and slider airbearings:

One problem is that such bearings will tolerate very little asymmetric force (sidewise, unidirectional force) compared to a hydrodynamic bearing utilizing a liquid lubricant. Such asymmetric forces may result in collapse of journal and slider airbearings. A journal bearing will support only a relatively small radial load. A slider airbearing will support only a relatively small force in the direction transverse to the direction of sliding motion. Therefore the conventional journal airbearing is designed to have an airflow pattern that is very symmetrical about the axis of rotation. The slider airbearing is designed to have an airflow pattern that is very symmetrical between both sides of a centerline parallel to the direction of motion.

U.S. Pat. No. 4,930,907 to Smith discloses construction of a journal airbearing in which a first airbearing area is disposed on one side of the rotor at the same angular position as an applied radial load and a second airbearing area is disposed on the opposite side. The location and sizes of these areas and the single value of air pressure applied to both bearing surfaces are all selected to balance the total force and moment on the bearing, including the load applied to the bearing, thereby establishing mechanical equilibrium. However, application of this design is limited to situations where the axial location of the applied radial load is fixed. Furthermore, there is no provision for optimizing the pressure to individual bearings to achieve maximum stiffness.

U.S. Pat. No. 4,930,907 to Smith discloses several devices for sensing applied load in airbearing systems. One construction is a mechanical approach in which pressure applied at the load is also applied at the airbearings. Another approach is electronic in which an electronic signal responsive to an applied load controls pressure differential between bearing interfaces. A third approach is hydraulic, in which hydraulic pressure signals generated by an applied load control the pressure differential between bearing interfaces.

U.S. Pat. No. 3,772,296 is for an airbearing system using a self-regulating regulator. The bearing system includes a regulator communicating with a "gauging" port located at the bearing interface which transmits pressure to the regulator which responds to the pressure signals to restore a preset pressure in the interface. The system does not address the problem of optimizing pressure for maximum stiffness.

Another problem with airbearings is that, under some conditions of applied air pressure and design, the bearing will resonate. The standard approach to eliminating resonance has been to design the bearing with certain parameters such as size of the orifice, area of land around the orifice, etc. However, onset of resonance has been very difficult to predict and these design approaches have been met with only limited success. Resonance normally occurs when the air pressure is raised to a critical value.

For further discussion of airbearing technology, the reader is referred to "Gas Lubricated Bearings" by Grassam and Powell, published by Butterworth, London, 1964 which is incorporated by reference into this specification.

THE INVENTION

Objects

It is an object of this invention to provide an airbearing system including a journal airbearing and/or slider airbearing that will support a large asymmetrical load. In the case of a journal airbearing, this would be a load applied in the radial direction and in the case of the slider airbearing, this would be a load applied transverse to the direction of sliding.

Another object is that the air bearing system accommodate a variable load.

Another object is to be able to apply the load at any location in a range of locations. In the case of the journal airbearing, this means any location along the axis of the bearing. In the case of the slider bearing, this would mean any location along the direction of slide.

Another object is to prevent the onset of resonance yet maximize the applied air pressure thereby maximizing the stiffness of the bearing.

Another object is to incorporate the use of the airbearing of this invention into various applications characterized by loads applied asymmetrically such as machining and grinding operations and where stiff bearings are required to achieve precision such as in producing masters for compact disks.

SUMMARY

This invention is directed toward a multi-airbearing system in which stiffness and tolerance to asymmetrical loads is achieved by the control of air pressure applied independently to each of the bearings that are part of the system so as to balance the total force and moment on the moving member (rotor or slider) and establish a pressure in each bearing that is great enough to provide maximum stiffness without generating resonance.

In one embodiment, individual measurements of pressure and flow rate are supplied to a computing system which performs an algorithmic operation to determine optimum applied pressure to establish maximum stiffness and mechanical equilibrium. The particular algorithmic operation employed depends on the bearing system.

One such algorithmic operation involves the use of a "lookup table" in memory to which measured pressures and flow rates are compared to determine target values of applied pressure.

Another algorithmic operation involves measuring individual pressures and flow rates to each of the bearing interfaces and computing an instantaneous impedance for each interface then adjusting the pressures to achieve optimum stiffness.

In accordance with the various embodiments of this invention, pressure may be measured at any one or several of a number of locations depending on the accessibility of the location and the sensitivity to the onset of resonance provided by the pressure measurement at the selected location.

For example, in one embodiment a gauging orifice may be provided whose one end may open onto the bearing surface and another end communicating with a pressure transducer.

In another embodiment, a pressure sensor may be connected to sense the pressure at the entrance to the airbearing with an external impedance connected between a pressure regulator and the entrance to the airbearing. The external impedance increases sensitivity of the pressure sensor to changes of pressure in the bearing.

In extending the application of this embodiment to machining operations, the apparatus further includes means for measuring the location of the applied force relative to the bearing surface areas and adjusting the pressure to each bearing to achieve mechanical balance. In the case of a lathe, the applied force is the force exerted by the tool bit against the part being machined. Since the location of the tool bit is constantly changing during a machining operation, the pressure distribution must be changed simultaneously with the changing location of the toolbit. In the case of a slider bearing for a mastering machine, the applied force is the weight of any load applied to the slider.

Yet another embodiment of the invention for a stiff hydrodynamic bearing is a journal bearing having a plurality of straight pressuized channels for conducting fluid extending axially on the inside surface of a cylindrical stator interleaved with straight exhaust channels. Entry to each pressurized channel is through a plurality of passages, one passage for each passage, each passage having an opening arranged on a perimeter of openings on the outside surface of the stator. A valve collar is mounted on the stator with an inside surface of the collar proximal to the passage openings. When the rotor shifts in one radial direction, the flow of fluid distributed among the passages is shifted causing the collar to be drawn such as to reduce fluid flow on a side of the rotor causing the rotor to be shifted back toward its original central position. It is understood therefore that the collar is a self acting valve which impedes flow through certain passages in response to shifts in the rotor thereby tending to stabilize the position of the rotor in its central location when radial loads are applied.

DESCRIPTION OF A PREFERRED EMBODIMENT

The following description presents various adaptations and modifications of the invention including what we presently believe is the best mode for carrying out the invention.

Figure 1:
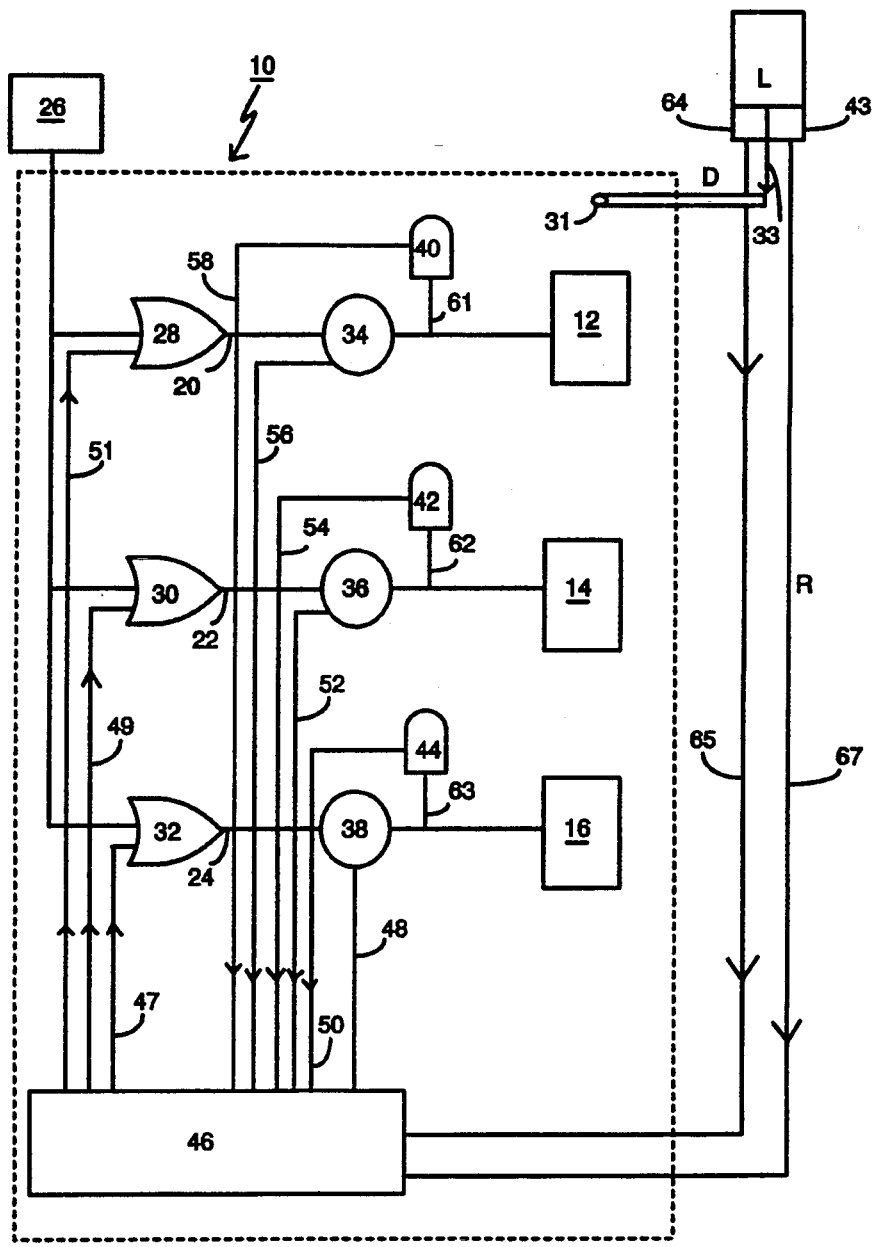
FIG. 1 is a schematic diagram of one embodiment of the hydrodynamic bearing apparatus of the present invention showing the various controls in relation to the bearings.

Turning to a discussion of the drawings, FIG. 1 is a schematic illustrating embodiment of the invention in which the bearing system 10 includes a number of bearings 12, 14, 16 (three are shown) and a location 33 for applying a load. Pressurized lubricant is supplied to each bearing interface through conduits 20, 22 and 24 respectively from a supply 26. The pressure to each bearing interface is controlled by a pressure regulator, 28, 30 or 32 respectively. Flow meters 34, 36 or 38 are connected in conduits 20, 22 or 24 between the respective regulators and bearings. Pressure meters 40, 42 and 44 measure pressure at the entrances to each respective bearing. Pressure signals from each of the pressure meters 40, 42 and 44 and the instantaneous flow signal from each of the flow meters 34, 36 or 38 are transmitted to a computer system 46 via input lines 48-58. The computer system conditions the signals for further computation by a computer included in the computer system 46. The computer system 46 computes the individual instantaneous impedance of each bearing from the respective measurement of pressure and flow rate then applies an algorithm determined by the construction parameters of the bearing to send out a control signal on lines 47, 49 and 51 to the respective regulator that adjusts the actual pressure to a target pressure for each bearing. The maximum target pressure is the maximum pressure for the bearing that can be applied without inducing resonance. The maximum target pressure for each bearing will depend on the construction parameters of the bearing. These parameters are selected in accordance with the purpose that the bearing serves in the overall bearing system. For example, the side bearings of a slider maintain lateral stability and therefore are selected to have one set of construction parameters while the bearing located between the underside of the slider and the topside of the slide is required to support load and therefore will have a different set of construction parameters.

The required target pressure is the value of pressure that will satisfy the requirement that the total force and moment on the bearing system is equal to zero. The ideal situation is that, when no load is applied, the pressure in each bearing is equal to the maximum target pressure providing that the bearing is operating with maximum stiffness that the bearing can achieve without going into resonance. Then when load is applied to the bearing system, the pressures in certain bearings will be reduced to a required target pressure in order to achieve mechanical stability while still avoiding resonance.

Figure 2:
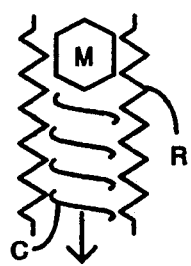
FIG. 2 is mechanical representation of the flow impedance showing a resistive, inertial, and compressive component.

The following discussion which is related to FIG. 2 presents our theory as to why the invention performs as it does although we do not wish to be bound by our theory inasmuch as the invention performs the functions as claimed regardless of whether the theory is valid or not.

Figure 3:
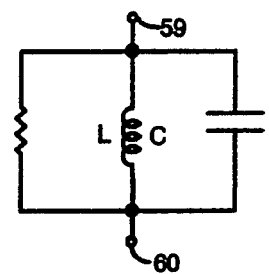
FIG. 3 is a resonating electrical tank circuit analogous to the "mechanical tank" flow impedance of FIG. 2.

FIG. 2 illustrates the fact that airflowing through a bearing interface has the mechanical characteristics of pure resistance R (arising from the viscosity of the air in contact with the walls of the interface), inertia M (arising from the mass of the moving air), and compressibility C. Each of these characteristics has an electrical analogy in that mechanical resistance corresponds to electrical resistance R, inertia corresponds to inductance L, compressibility corresponds to capacitance C. An electrical tank circuit that may be considered to be analogous to an airbearing with regard to these impedance components is shown in FIG. 3. The impedance between terminals 59 and 60 corresponding to the entrance and exit ports of an airbearing is given by:

$$RjwL/(jwL + R - Rw^2LC)$$

$$w = 2\pi f \text{ and } j = \sqrt{-1}$$

where f=frequency.

When R is very small, current will pass between the terminals with very little impedance and no resonance will occur. When R is very large, resonance will occur with a frequency $$f = 1/(2\pi \sqrt{LC})$$

Generation of resonance in a tank circuit (FIG. 3 or the mechanical analogy, FIG. 2) requires spurious fluctuation in the d.c. pressure applied between terminals 59 and 60. In the case of the airbearing, at least two situations may occur that would generate such a fluctuation. In one situation, R may be very large and a d.c. flow may be imposed that has fluctuations whose amplitude increases as pressure is increased until the amplitude of the fluctuations reaches a value sufficient to generate resonance. In another situation, the viscosity of the airflow in contact with the surfaces of the interface may increase as pressure increases thereby causing an increase in R and leading to resonance.

Of course the electrical tank circuit shown in FIG. 3 does not strictly represent the typical airbearing. However, we have found that, in the general case, an airbearing will resonate when the applied pressure reaches a critical value as discussed above so that optimum pressure applied to the airbearing is a pressure just below a value where resonance occurs thereby providing the stiffest bearing that can be achieved for that particular bearing construction.

The method of this invention is to measure a signal corresponding to pressure at a location in the bearing and the flow rate to the bearing which is transmitted to a computer which operates on the signals according to a algorithm that is determined by the construction of the bearing, to control the applied pressure at a value close to but below a critical applied pressure where resonance would occur. A pressure sensing means generally includes a metering passage having a transducer end communicating with a transducer and a system end communicating with the system to be measured. Selection of a location where the system end communicates with the system depends on the situation.

Figure 12:
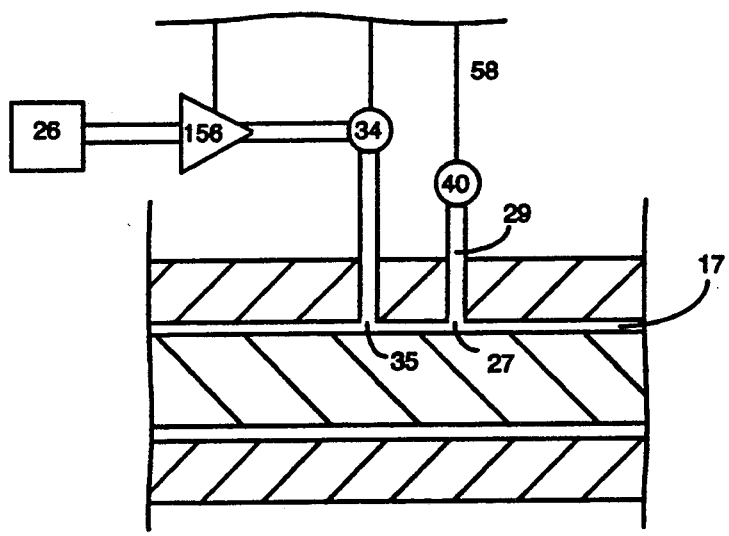
FIG. 12 shows in cross section a fluid dynamic bearing illustrating the interface with fluid supply entrance and metering passage with a system end communicating with the interface and a meter end communicating with a pressure transducer.

FIG. 1 shows one situation, where the metering passages 61, 62 and 63 have transducer ends connected to pressure sensors 40, 42, 44 respectively and system ends communicating with conduits 20, 22 and 24 adjacent to the air supply entrances to bearings 12, 14 and 16 respectively. However, if response to load changes must be quicker and more sensitive than can be achieved by the location of system ends of metering passages 61, 62 and 63, shown in FIG. 1, then an arrangement such as shown in FIG. 12 is appropriate where a cross section of an airbearing with bearing interface 17 is shown having a metering passage 29 with a system end 27 opening onto bearing interface 17 and meter end 23 communicating with pressure sensor 40. The system end opening 27 is adjacent to air supply entrance 35 from supply 26 through regulator 155 and flow meter 34. The pressure signal from pressure meter 40 is conducted on line 58 to computer 46 (not shown in FIG. 12) controlling regulator 155. Location of the metering passage 29 effectively bypasses the impedance presented by the air supply passage 37 and air supply entrance 35 (the orifice) leading to the interface 17 so that pressure is measured at a location where pressure in combination with airflow is a more sensitive indicator of the imminence of resonance than the arrangement shown in FIG. 1.

In view of the preceding remarks, an embodiment of this invention is a pressure sensor and airbearing including a metering passage having a system end opening onto the bearing interface and a meter end communicating with the pressure sensor.

The method of this invention therefore is distinguished from the prior art (e.g., U.S. Pat. No. 3,722,996 to Fox and U.S. Pat. No. 4,930,307 to Smith) in that the prior art makes no provision for maintaining the pressure at a value, just above which, resonance will occur but which provides maximum stiffness.

The second condition that must be established to provide maximum stiffness and asymmetric load carrying capability is to apply pressure to each bearing having a value determined by the load and location of the load relative to the bearings that result in zero force and moment measured about an arbitrary reference point. This feature is represented in FIG. 1 by indication of load L, applied at a variable perpendicular distance D from an arbitrary reference point 31 to line 33 representing direction of the applied load L.

In accordance with this invention, either one of two approaches may be applied to balancing forces and moments in order to achieve mechanical equilibrium. One approach is to measure the applied load and distance of application directly. The second approach is to detect changes in the impedances of the bearings due to the applied load and adjust the applied pressure to the bearings accordingly. A third alternative is to use both techniques, in which measurement of magnitude and position of the load is used to make gross corrections of applied pressure to balance the load and the second approach is used to "fine tune" the adjustments. Both of these approaches are discussed in the following paragraphs.

According to the first approach, a means 64 for measuring load L, and a means 43 for measuring distance D generates signals corresponding to L and D which are transmitted to computer 46 on signal line 65 and 67 respectively. Computer system 46 then determines the pressure that must be applied in each of the bearings in order to achieve mechanical equilibrium of the bearing system. A signal corresponding to these calculated pressures is then transmitted from the computer system 46 to each of the pressure regulators 28, 30 and 32 and each of the regulators adjusts the pressures accordingly.

Figure 4:
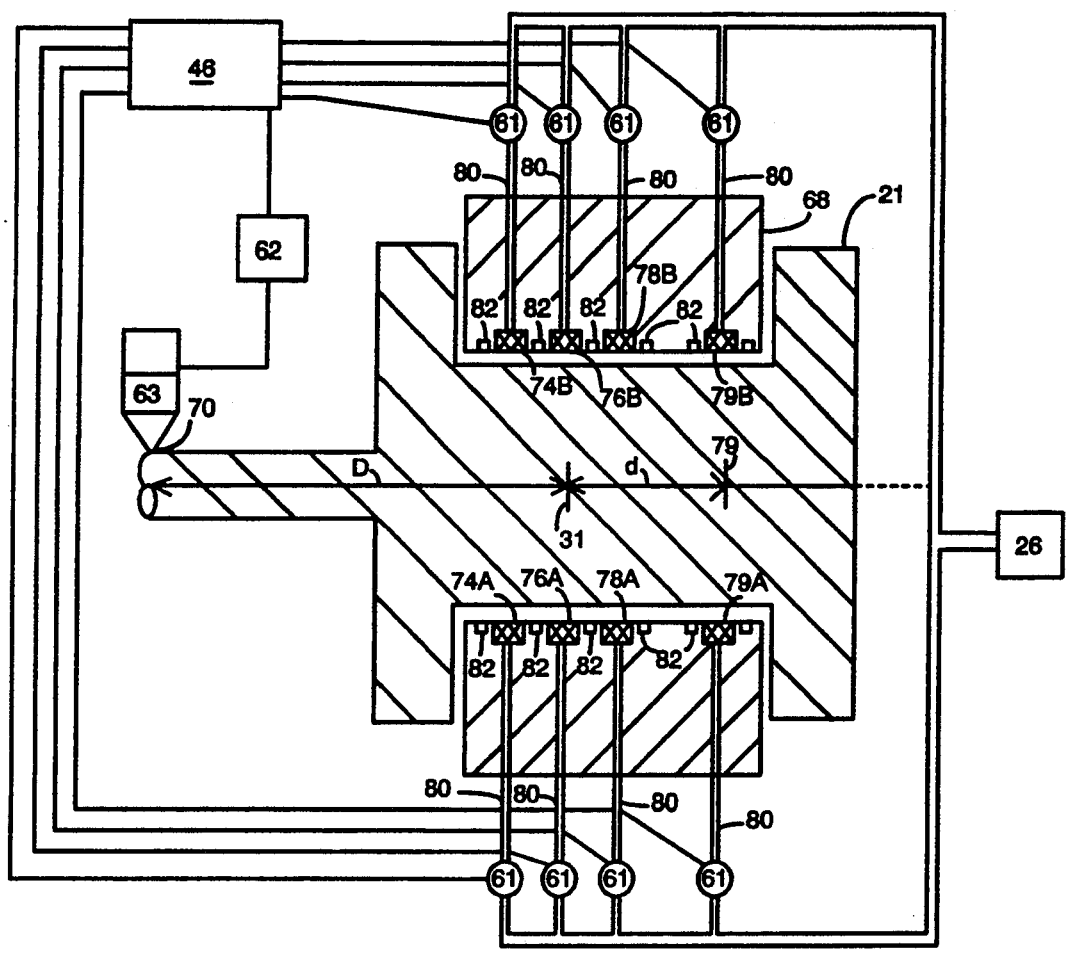
FIG. 4 is a cross section of a journal bearing illustrating bearing interfaces to achieve mechanical equilibrium.

An example of this embodiment is illustrated in FIG. 4 where there is shown the sectional view of the rotor 21 and stator 68 of a journal bearing. The rotor 21 extends beyond the stator 68. A radial load, L, is applied to the rotor at a location 70 which is distance D, from a reference location 31. The magnitude of the load is detected by load cell 63 which transmits the load signal to computer 46. The stator is configured to define bearing interfaces, 74a, 76a, 78a, and 79a which are mirror images of 74b, 76b, 78b and 79b respectively. Each bearing interface has individually pressurized lubricant supplied by one of inlets 80 and each bearing interface is bounded by two of grooves 82 with exits. Pressure to each bearing surface is controlled individually by regulators 61 responding to signals from computer 46.

The arbitrary reference point 31 for computing moments generated by the load and pressurized interfaces will be taken to be the intersection of the line between the centers of interfaces 76a and 76b with the axis of the rotor. The distance from the reference point 31 to the load is D and is measured by sensor 62 which transmits the value, D, to computer 46. The distance between the reference point 31 and the intersection of centerline of 79a and 79b with the axis (point 79) is d.

The areas of the interfaces are selected such that the projected areas of each interface in the direction of the load satisfy:

$$A74a = A74b = A78a = A78b$$

$$A76a = A76b = A79a = A79b$$

$$2 \times (A74a) = A76a$$

The force of each bearing interface against the rotor equals the respective pressure multiplied by the projection of the area (A74a, etc.) of the interface in the direction of applied load. When there is no applied load, lubricant pressure in all bearing interfaces are maintained at just below the critical resonance value thereby ensuring against resonance while achieving maximum stiffness.

When load L, is applied, the pressure in bearing interfaces, 79a and 76b are reduced by an amount P79a given by $$(P79a) = DL/d \, (A79b)$$

and the pressure in 74b and 78b is reduced by $$P74b = L/(A74a)$$

The second approach, which is another embodiment of this invention and satisfies the object to maximize stiffness and tolerance to asymmetrical load, is based on the observation that, when a force is exerted against a bearing interface, the walls of the bearing interface are squeezed closer together causing an increase in the flow impedance of the bearing interface.

Figure 5:
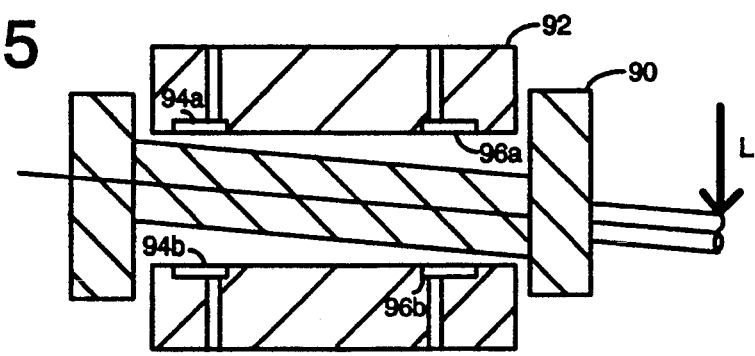
FIG. 5 shows a cross sectional view of a journal bearing illustrating the tilting of the rotor and change of bearing impedance with applied load.

FIG. 5 shows a bearing comprising a moving member 90 (the rotor) supported by a stator member 92 forming bearing interfaces 94a and 94b and 96a and 96b. The rotor is tilted by application of load L so that bearings 94a and 96b are squeezed causing an increase of the respective flow impedances and 94b and 96a expand causing a decrease in the impedances. Before application of the load, the pressure in all four bearing interfaces is at maximum target value. After application of the load, it is required to maintain pressure in bearings 94a and 96b at this value and restore balance by decreasing pressure in 94b and 96a. If Pmt and Sm are the pressure and flow respectively in the bearings before application of the load, then the impedance of the bearing interface is Pmt/Sm. After application of the load, the impedance in bearings 94b and 96a will be P/S where P and S are the instantaneous pressure and flow rate respectively. Furthermore, $$P/S < Pmt/Smt$$

i.e., the impedance of the "expanded" bearings will have decreased below the target value. By reducing P, the width of bearing interfaces 94b and 96a will decrease causing a rise in P/S toward Pmt/Smt.

The reduction in flow to interface 94b and 96a is detected by flowmeters which transmit this information to computer system 46 which controls regulator 90 to reduce pressure to bearing interface 86, thereby restoring displacement of the rotor to zero.

Figure 6:
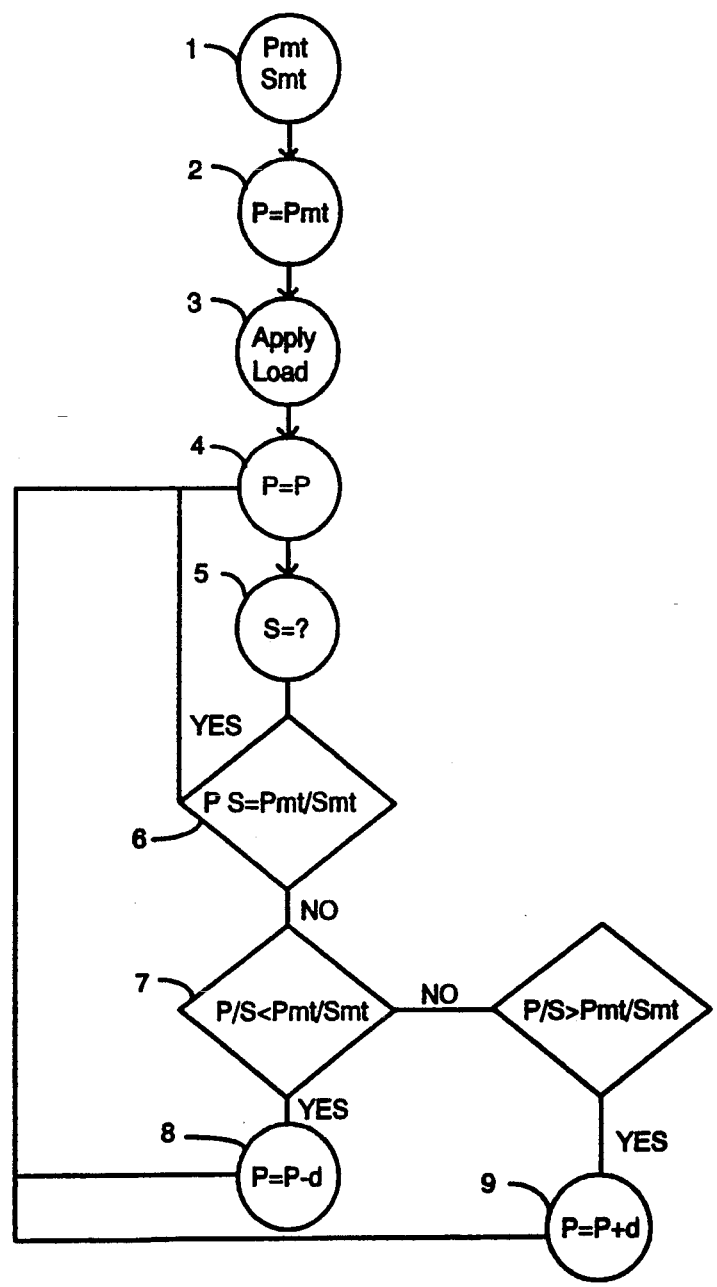
FIG. 6 is a flow diagram of the method for achieving mechanical equilibrium in a bearing by optimizing flow impedance of each bearing.

In summary, equilibrium is restored as listed in FIG. 6 by the following steps.

| | |
|---|---|
| Step 1 | Determine maximum target pressure, Pmt and flow rate Smt. |
| Step 2 | Apply pressure P = Pmt and flow rate S = Smt in each bearing. |
| Step 3 | Apply load. |
| Step 4 | Maintain pressure P' in bearings 94a and 96b at Pmt. |
| Step 5 | Maintain pressure in bearings 94b and 96a at P. |
| Step 6 | Determine S in bearing 94b and 94a. |
| Step 7 | If P/S = Pmt/Smt, go to step 4. |
| Step 8 | If P/S < Pmt/Smt, reduce P by small increment p and go to step 4 |
| Step 9 | If P/S > Pmt/Smt increase P by small increment p and go to step 4 |

Figure 7:
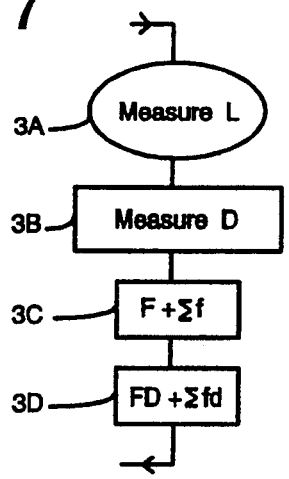
FIG. 7 is a flow diagram of the method of achieving mechanical equilibrium in a bearing by balancing forces and moments.

In the nine steps listed in the foregoing paragraph, the apparatus of FIG. 1 was applied to maintain mechanical equilibrium in the case where the load is small enough or applied slowly enough such that pressure to each bearing can be adjusted quickly enough to prevent crashes of the bearing. In other cases, the force and location of the load is measured as discussed above and these values are figured in to the calculations in order to adjust the pressures in accordance with the steps listed in FIG. 7. In this situation, the following steps are followed after step 3:

| | |
|---|---|
| Step 3A | Measure the force F applied by the load. |
| Step 3B | Measure the distance D between a reference point and the line of application of the applied force. |
| Step 3C | Calculate the sum of the total forces on the bearing system which equals the force of the load F, plus the force f, from each bearing interface which equals the individual applied pressure multiplied by the individual projected area. |
| Step 3D | Calculate the sum of the total moments on the bearing system which equals the sum of F × D plus the moment of force of each bearing about the reference point. |

Figure 8:
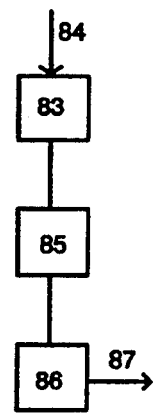
FIG. 8 is a schematic diagram of the computer system for optimizing stiffness of the bearings of the bearing system.

FIG. 8 shows a schematic diagram of the computer system 46 in FIG. 1 and discussed above. The computer system includes a controller and conditioning circuits for conditioning the signals from the meters for reception by the computer and circuit for sending control signals to the regulators. There are shown a plurality of daughter boards 83, each daughter board dedicated to receiving an analog signal on lines 84 from a respective sensor (pressure or flow rate) which converts the signal to an analog value that has been normalized for receipt by a mother board 85. The normalized analog signal is multiplied and transmitted to the controller 86. The controller converts the signal to a digital signal and then applies an algorithm stored as a program to compute a target pressure to be applied to the bearing and then transmits an analog signal corresponding to the target pressure to the respective bearing pressure regulator on lines 87.

The algorithm may take any one of a number of forms depending on the requirements of the bearing system, all of which are embodiments of this invention. In one form, the algorithm may be a table of pressure values vs. applied load which have been determined empirically. In another form, (as discussed supra) the algorithm is a computation of instantaneous impedance P/S, (pressure divided by flow rate) and compares this ratio to stored target values of pressure and flow rate (Pmt and Smt). If the impedance is too small or large, the computer sends a signal on line 87 to increase or decrease respectively the differential pressure between the respective airbearing and its paired bearing.

Figure 9:
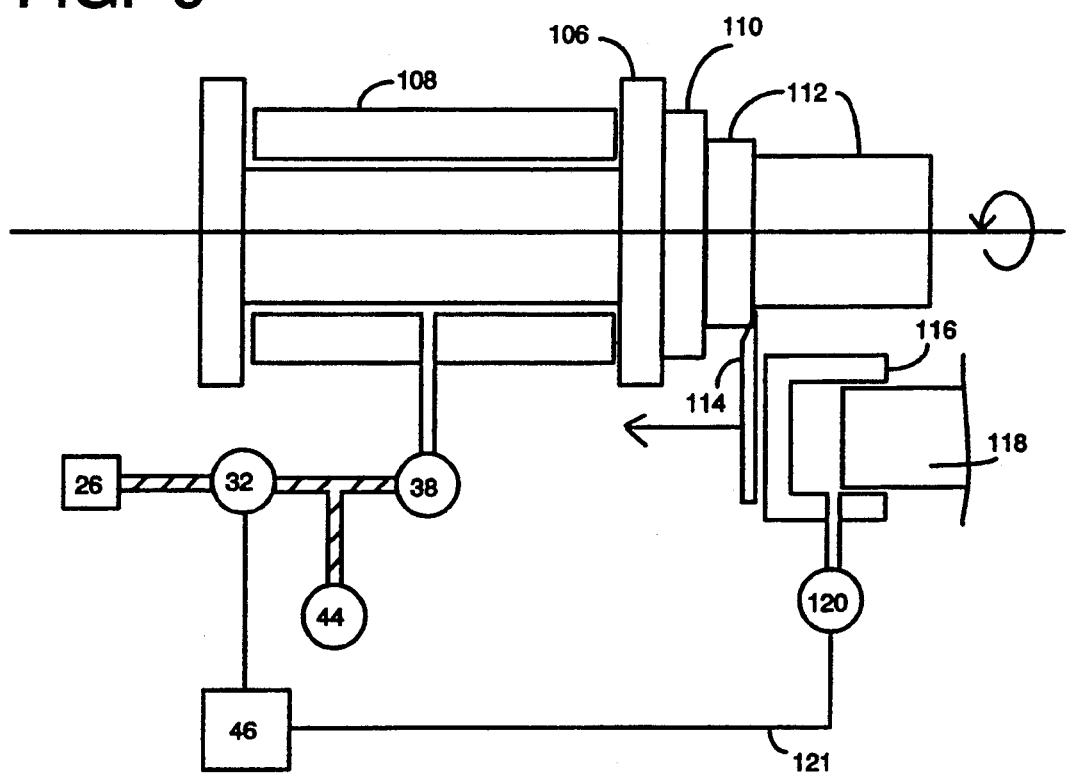
FIG. 9 shows an embodiment of the invention for maximizing stiffness applied to the bearings of a lathe.

FIG. 9 shows an application of the principles of this device to machining a metal bar on a lathe.

There is shown the rotor 106 and stator 108 of a journal bearing supporting a chuck 110 in which a metal bar 112 is secured to be machined by a toolbit 114 moving in the direction of the centerline of the bar 112. The toolbit 114 is secured to the plunger 116 of a toolbit holder 118 driven by the crossfeed (not shown) of the lathe. Pressure generated by the force of the toolbit 114 against the holder 118 is transmitted to the pressure sensor 120 as the toolbit 114 machines the bar 112. The pressure sensor 120 generates a signal on line 121 which it transmits to the computer system 46 which then applies a computed signal to regulator 32 to apply the required balancing pressure through flowmeter 38 with pressure meter 44 as described above.

Figure 10:
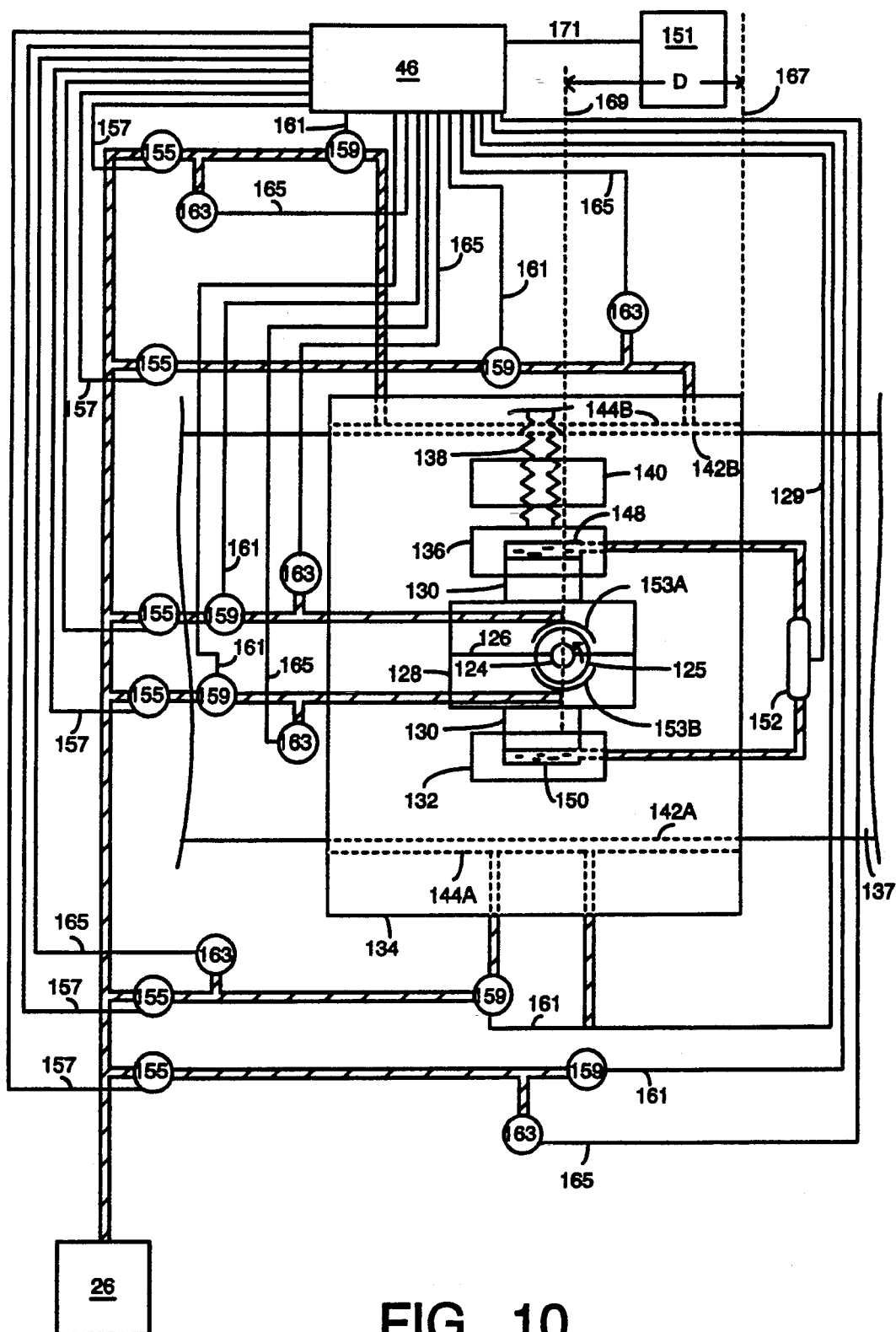
FIG. 10 shows an embodiment of the invention for achieving maximum stiffness applied to a mill for machining metal.

In the foregoing example, the load applied by the toolbit to the airbearing was determined by measuring force that the toolbit exerted back on the toolbit holder. However, the load may be determined at any one of a number of locations. For example, FIG. 10 shows the principles of this invention applied to a milling cutter 124 milling a step 126 in a metal part 128 held in a vice. Each jaw of the vice includes a piston 130 inserted into a housing. One housing 132 is fixed to the top side of a slider 134 and the other housing 136 is actuated by a screw 138 threaded into a base 140 which is supported on the slider 134. The slider 134 is slideably supported on way 137. Two pairs of opposing side bearing interfaces (142a opposing 142b and 144a opposing 144b) between the way 137 and slider 134 are shown in phantom. The cutter 124 is machining a step 126 in part 128 and thereby generating a pressure differential P between the cavities 148 and 150 of the piston housings. This pressure differential P is sensed by pressure sensor 152 thereby generating a load signal which is transmitted on line 129 to the computer system 46. The mill spindle 125 supporting the cutter is supported by opposing bearings 153 A and B. When side force is applied by the cutter on the mill spindle, pressure in these bearings must be adjusted relative to one another in order to balance moment and force on the spindle bearing. Air pressure is supplied individually by supply 26 to the respective bearing interfaces through regulators 155, each of which receive control signals on respective lines 157 from the computer system 46. The airflow from each regulator 155 continues through one of flow meters 159 to the respective airbearing. A signal responsive to the rate of flow through each flow meter 159 is transmitted over lines 161 to the computer system. The pressure in each bearing interface is measured by pressure meters 163 and corresponding pressure signals are transmitted over lines 165 to the computer system 46. A position sensor 151 measures the distance D, between a reference centerline 167 and the cutter centerline 169. The value of "D" is transmitted over line 171 to the computer system 46 and is used to calculate the moment generated by the side pressure P on the bearing system. (The reference center line is the reference line used to calculate all the moments exerted on the bearing system by all the bearings.)

The embodiment of FIG. 10 illustrates that the invention includes in its scope application of the principles of the invention to a bearing system wherein an individually controlled pressure to each of a plurality of bearings (located in the slider and the spindle) must satisfy the conditions for mechanical equilibrium consistent with maximum pressure short of inducing resonance in order to achieve maximum stiffness.

Figure 11:
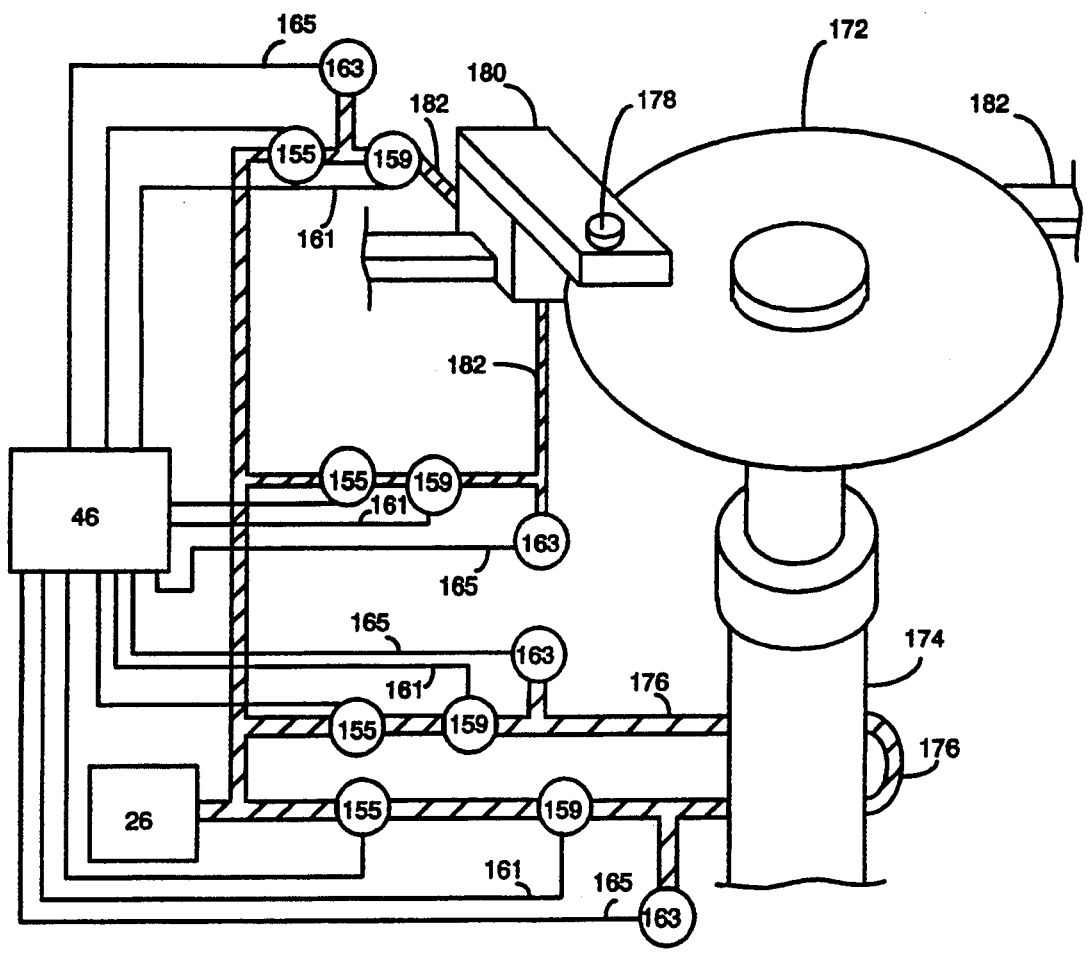
FIG. 11 shows the invention applied to the manufacture of a compact disk mastering machine.

FIG. 11 shows another machine with a sliding bearing and a journal bearing, both of which bearings require great precision of positioning and alignment. The machine is the mastering machine used to make the master disks in COMPACT DISK manufacturing. The process involves moving a modulated laser beam in the radial direction across the photoresist surface of a spinning disk thereby generating a helical modulated path of exposed photoresist. There is shown a master disk 172 rotatably supported on a journal bearing 174 with opposing bearing interfaces (not shown) supplied with pressurized air through conduits 176. A laser 178 exposes a photoresist film on disk 172 and is mounted on the slider 180 sliding on a way 181. The slider 180 is supported by bearings (not shown) lubricated with pressurized air supplied by conduits 182. Air is supplied from supply 26 through pressure regulators 155 and flow meters 159. Pressure is measured by meters 163. Pressure and flow rate measurements from the respective meters 163 and 159 respectively are transmitted to the computer over lines 165 and 161 respectively and the computer calculates the appropriate control signals which are sent to control pressure regulators 155 as discussed supra.

In practice, pressure meters that can incorporated into the apparatus of this invention for measuring pressure in order to calculate flow impedance may be obtained from the Motorola Corp. These are items 40, 42 and 44 in FIG. 1. A description and operating parameters of these devices are presented in data sheet MPX700D which is incorporated by reference into this specification.

Airflow meters that can be incorporated into the apparatus of this invention are manufactured by Microswitch, a division of Honeywell. These are items 34, 36 and 38 in FIG. 1. A description and operating parameters of these devices are presented in data sheets AWM5000 which are incorporated by reference into this specification.

The Heidenhain Corp., located in Schamburg, Ill., manufactures displacement measuring devices (item 43 in FIG. 1) such as are mounted on the slides (ways) of mills and lathes providing digital readouts of the displacement of the part being machined.

Daughter boards for normalizing the analog pressure signal are available from Fox Instrument and Airbearing Co. Livermore, Calif. model 922003. (Item 83 in FIG. 8.)

Daughter boards for normalizing the flow rate signal are available from Fox Instrument and Airbearing Co. model number 922 002. (Item 83 in FIG. 8.)

Mother boards for convening the normalized analog signal to a digital signal receptive to the computer are available from Fox Instrument and Airbearing Company model number 922001. (Item 85 in FIG. 8)

A pressure regulator for controlling the pressure to individual airbearings responsive to signals from the controller is manufactured by SMC Pneumatic, Inc., San Jose, Calif., NIT 200 series. (Item 28, 30, 32 in FIG. 1 and item 155 in FIG. 11.)

A controller for receiving the signals and performing the algorithms may be Vernal Controller 93/X located in Los Altos, Calif.

In the foregoing paragraphs, embodiments have been described which meet the objects of the invention which are to optimize the stiffness and asymmetrical load carrying capability of a hydrodynamic bearing system. A major feature of the invention is a method and apparatus to control pressure of pressurized lubricant supplied to each interface of each bearing to establish target values of pressure and flow rates in each interface of a bearing system such that a sum of an applied load and the forces on each moving bearing member is substantially zero and the sum of the moments about any axis exerted by the load and forces on the respective bearing member is substantially zero and such that the target values provide substantially maximum achievable stiffness to the interfaces without inducing resonance.

In one embodiment, this is accomplished by measuring the pressure and flow rate of lubricant supplied to the bearings and computing a flow impedance for each bearing interface. As pressure to the bearing is increased, stiffness and flow impedance of the interface will increase until pressure is increased to the target pressure and the impedance will equal a target impedance. Therefore, guided by the impedance measurement of pressure and flow rate, the method of this invention is to maintain pressure at the target pressure.

The scope of the invention includes two methods for maintaining mechanical equilibrium when a load is applied asymmetrically. In one method, changes in impedance are measured and pressure is adjusted in accordance with these changes to restore the original target impedances. In the second method, the magnitude and location of the applied loads are measured from which changes in the individual interfaces are computed which are required to establish the condition where the sum of the forces and load on each bearing and the sum of the moments on each bearing is substantially zero (mechanical equilibrium).

FIGS. 13–17 show another embodiment of the invention for providing a stiff journal bearing.

Figure 13:
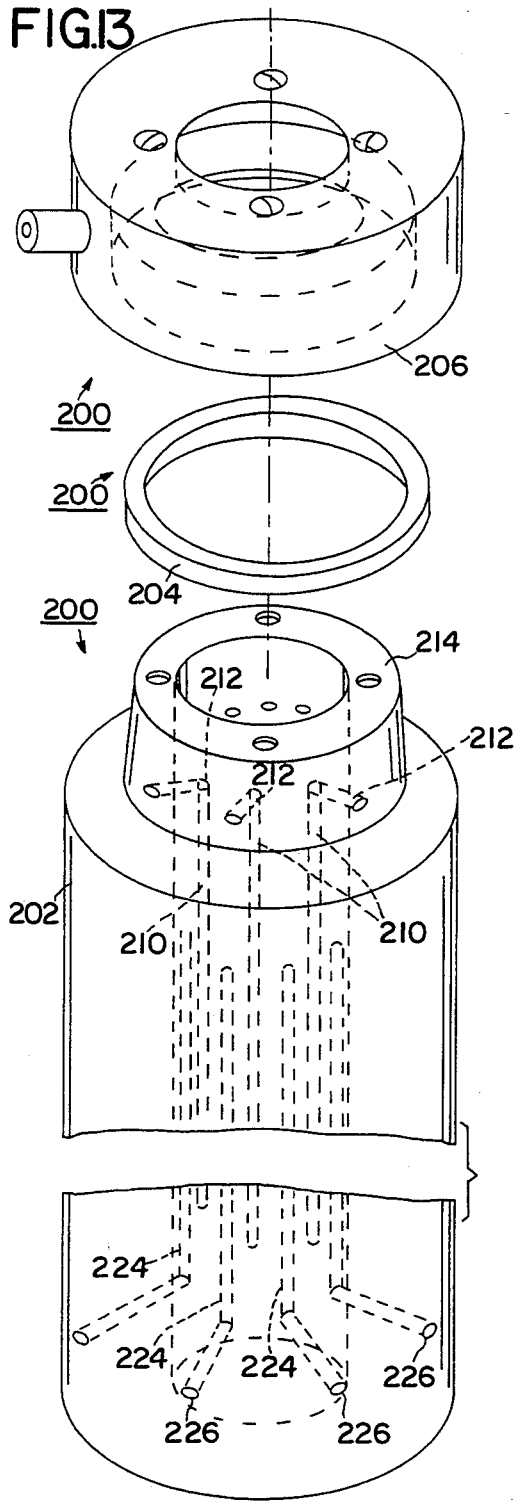
FIG. 13 shows an exploded view of a stator of the invention.
Figure 14:
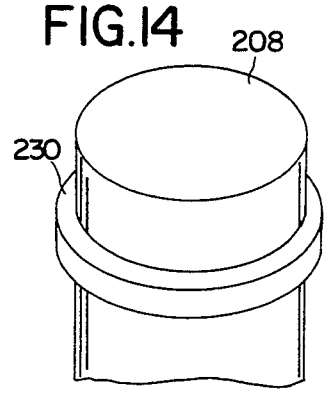
FIG. 14 shows a rotor to be inserted in the stator of FIG. 13.
Figure 15:
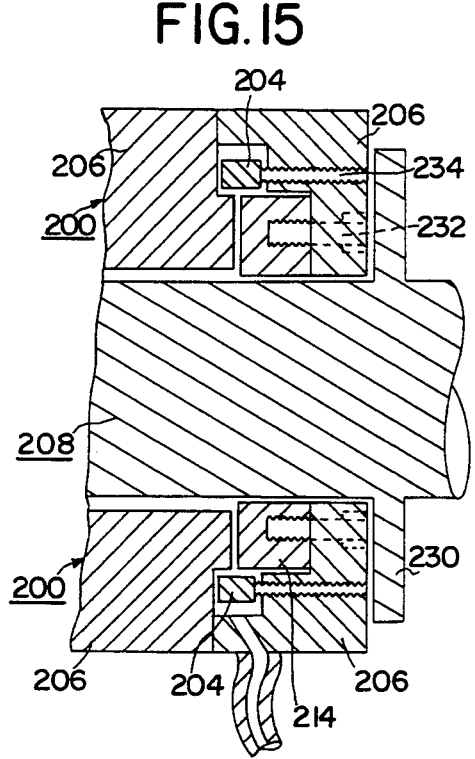
FIG. 15 shows a sectional view of the journal bearing of FIGS. 13 and 14.
Figure 16:
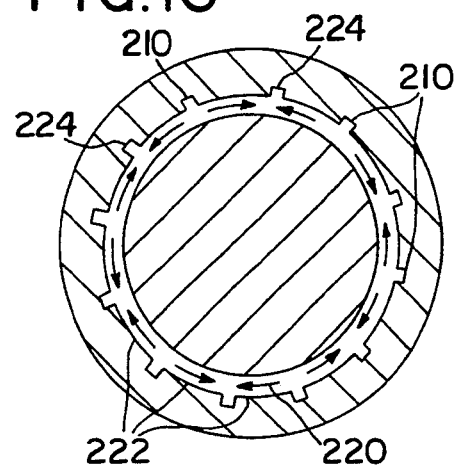
FIG. 16 shows the air flow pattern of the bearing.
Figure 17:
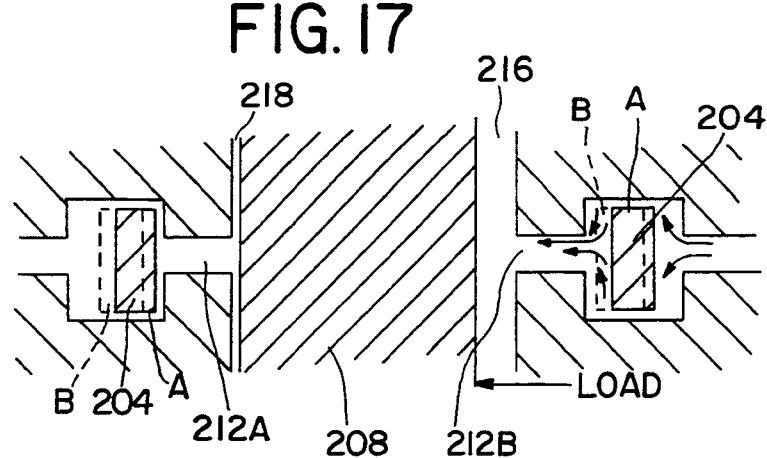
FIG. 17 shows the action of the collar in controlling the flow pattern of the bearing of FIGS. 13, 14.

FIG. 13 is an exploded view of the stator 200 showing a body section 202, a collar 204 and cap 206. FIG. 14 shows the rotor 208 (cutaway) with retaining collar 230. FIG. 15 is a sectional view showing the rotor 208 rotatably positioned inside stator 200. FIG. 13 shows a plurality of fluid supply channels which extend axially along the inner surface of the body section 202 supplied by pressurized fluid (e.g. air or other lubricating fluid) through orifices 212. FIG. 15 shows collar 204 mounted on the shoulder 214 of body 202 such that flow through passages 212 is controlled by the position of collar 204 as shown in FIG. 17. FIG. 17 shows a LOAD applied to the rotor causing the rotor to shift to the left thereby widening space 216 and narrowing space 218. This causes an increase in flow as shown by the arrows which causes the collar to shift from position A to B thereby reducing flow through aperture 212B and increased flow through 212A. Thus, it is seen that the collar shifts in a direction to counteract shifting the rotor due to application of the load. The flow pattern between the stator-rotor interface 220 is shown in FIG. 16. Flowing across lands 222 from pressurized supply channels 210 and exiting to exhaust channels 224 and out exhaust ports 226 shown in FIG. 13. Cap 206 is secured to body section 206 by bolts 232 (FIG. 15). Bolts 234 in cap 206 hold collar 214 in its axial position by light contact.

Figure 18:
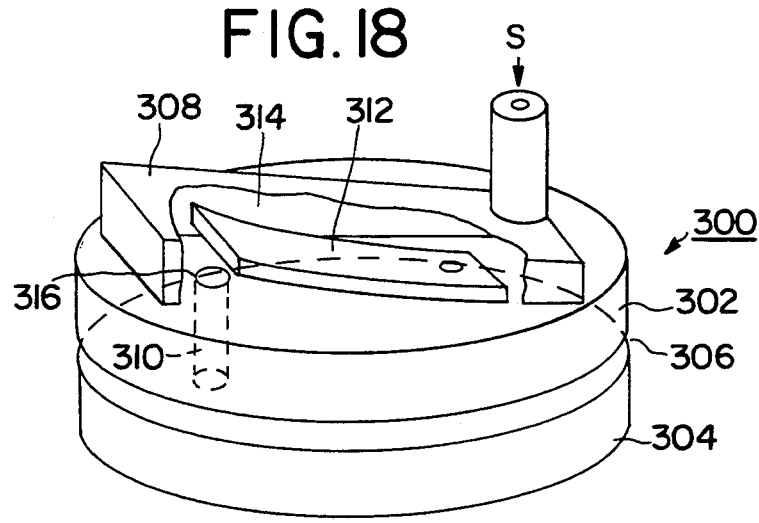
FIG. 18 shows a slider bearing with a self-acting control valve.

The journal bearing of FIGS. 13-17 is a special case of the principle of the self acting valve which is within the scope of the invention. Another version is shown in FIG. 18 in which the self acting valve principle of this invention is applied to a slider bearing 300. The slider bearing 300 comprises two plates 302 and 304 shown cutaway and separated from one another by flow space 306. A housing block 308 (cutaway) is mounted onto the top surface of plate 302 and fluid from source S enters the housing block, passes through passage 310 and enters space 306. A valve flap 312 is mounted inside the housing 308 such that a free end 314 is positioned over the opening 316 to passage 310. When plate 304 moves away from plate 302, fluid flow in space 306 increases so as to draw valve flap toward opening 316 and limit fluid flow.

The principles of this invention may be applied to any hydrodynamic system including bearings lubricated by gaseous or liquid lubricants.

The bearing system may comprise machine tools such as a lathe, grinder or mill or a mastering machine for compact disks which would include an airbearing spindle for rotatably supporting the disk and a horizontal airbearing slide.

We wish to define the scope of our invention by the scope of the appended claims.

We claim:

1. A fluid dynamic bearing system supplied with pressurized fluid through a conduit means from a supply for supporting a load applied asymmetrically at a location to the bearing system which comprises:
    at least one moving bearing member, each bearing member having a plurality of moving surfaces;
    at least one stationary bearing member, each one stationary bearing member paired with one of said moving bearing members and each stationary bearing member having a plurality of stationary surfaces;
    each said stationary surface paired with one of said moving surfaces respectively to form a bearing interface having an area, an interface location, a fluid supply entrance and an exit;
    fluid pressurized to flow through each said entrance across said respective interface and out of said respective exit thereby creating fluid dynamic pressure in each said interface;
    means to control pressure of said pressurized fluid in each said interface to establish target values of pressure and flow rates independent of said target values of pressure and flow rates in other said interfaces such that a sum of the load and the forces on each said moving member exerted by said target pressure in each interface is substantially zero and the sum of the moments about any axis exerted by said load and the forces on said member exerted by said target pressure in each interface is substantially zero and such that said target values provide maximum stiffness of said interfaces without inducing resonance in said bearing interfaces.

2. A bearing system as in claim 1 wherein said controlling means comprises a plurality of pressure regulators, one regulator connected between one said fluid supply entrance of each said interface and said supply of pressurized, each said regulator having an input terminal means for receiving a target signal according to which said regulator establishes said pressure.

3. A bearing system as in claim 2 wherein said controlling means comprises a plurality of pressure meter means with a first terminal, each one pressure meter means communicating with said system for monitoring pressure in each one said interfaces respectively and for generating a pressure signal at said first terminal corresponding to said pressure in said respective bearing interface.

4. A bearing system as in claim 3 wherein said pressure meter means comprises a metering passage in said stationary member having a system end communicating with said interface adjacent to said fluid supply entrance and a metering end communicating with a pressure sensor means for generating said pressure signal.

5. A bearing system as in claim 3 wherein said pressure meter means comprises a metering passage having a system end communicating with said bearing system and a metering end communicating with a pressure sensor means for generating said pressure signal.

6. A bearing system as in claim 3 wherein said controlling means comprises a a plurality of flow meter means, each flow meter means having a second terminal and each one of said flow meter means connected between one of said fluid supply entrances and said respective pressure regulator for measuring a value of rate of flow of fluid to said respective interface and generating a flow signal at said respective second terminal corresponding to said flow rate value in said respective interface.

7. A bearing system as in claim 6 wherein said controlling means comprises means connected to each said first and second terminals for receiving said pressure signal and said flow signals respectively and performing an algorithmic operation with said signals to determine a required target pressure for each interface and having a third terminal means connected to said input terminal of each said pressure regulator for transmitting said target signal to said respective regulator.

8. A bearing system as in claim 7 wherein said means for performing said algorithmic operation is a computer.

9. A bearing system as in claim 7 wherein means for performing said algorithmic operation comprises:
    means for determining values of said pressures and said flow rates from said respective pressure and flow signals;
    means for dividing each said value of pressure by said respective value of flow rate thereby providing an instantaneous flow impedance for each said interface;
    means for comparing said instantaneous impedance to a target impedance equal to said target pressure divided by said target flow rate and emitting a signal on said third terminal means to said respective regulator to increase pressure to said respective regulator when said instantaneous impedance is less than said target impedance and to decrease said respective pressure when said instantaneous pressure is greater than target impedance.

10. A bearing system as in claim 1 which comprises:
    means for measuring distance between said load location and a reference location and emitting a load distance signal responsive to said load distance measurement;

means for measuring said load and emitting a load signal responsive to said load measurement; and said controlling means comprises:

terminal means for receiving said load and said load distance signal;

means for computing from said load signal and said load distance signals a load moment generated by said load about said reference location and determining therefrom signals corresponding to pressures to be applied to said pressure regulators to maintain mechanical equilibrium in said bearing system and sending said signals to said regulators.

11. A bearing system as in claim 1 wherein said moving member is a rotor of a journal bearing and said stator member is a stator of said journal bearing.

12. A bearing system as in claim 1 wherein said moving member is a slider of a slider bearing and said stator member is a way supporting said slider of said slider bearing.

13. A bearing system as in claim 1 wherein said fluid is gas.

14. A bearing system as in claim 1 wherein said fluid is liquid.

15. A bearing system as in claim 1 which comprises a lathe having fluid dynamic bearings.

16. A bearing system as in claim 1 which comprises a mill.

17. A bearing system as in claim 16 wherein said mill comprises:

a way;

a slider slideably supported by said fluid dynamic bearings on said way;

a vice means for securing a pan to be machined secured on said slider.

18. A bearing system as in claim 17 wherein said vice means comprises:

a first jaw housing having a cavity and secured to said slider;

a first jaw piston having a first free end and a first piston end slideably engaged in said first cavity;

a base secured to said slider;

a screw through said base;

a second jaw housing secured to an end of said screw;

a second jaw piston having a second free end and a second piston end slideably engaged in said second jaw housing such as to form a second cavity;

fluid in said first and second cavities;

means for measuring differential pressure between said first and second cavities and emitting differential pressure signal providing that said part may be positioned between said first and second piston ends, said screw may be tightened to secure said part, and, when a force is exerted on said part in a direction between said first and second piston ends, a differential pressure signal will be generated corresponding to a magnitude of said force.

19. A bearing system as in claim 1 which comprises a mastering machine for manufacturing compact disks wherein said mastering machine comprises:

a spindle means for rotatably supporting a master disk with a photoresist surface;

fluid dynamic means for supporting said spindle;

a laser means for exposing said photoresist surface;

a slider means for supporting said laser means;

a way means for supporting said slider.

20. A bearing system which comprises:

a stator member with at least one stationary bearing surface;

a moving member having at least one moving bearing surface opposed to one of said stationary bearing surfaces respectively thereby forming at least one bearing interface;

each said interface having a fluid entrance permitting pressurized fluid to flow through said fluid entrance into said interface;

at least one metering passage, one said metering passage for each interface respectively, and having a system end communicating with said interface and a meter end;

at least one pressure sensor communicating with each one of said meter ends respectively.

21. A method for supporting a hydrodynamic bearing system having bearing interfaces and fluid supply entrances to said interfaces and with a load applied to said bearing system which includes the steps:

supplying pressurized fluid to said fluid supply entrances;

measuring pressure of said fluid at each said interface thereby obtaining a value of fluid pressure at each said interface;

measuring fluid flow rate into each said interface thereby obtaining a value of flow rate at each said interface;

computing an adjustment of pressure of fluid to be applied to each said interface by applying an algorithm to said pressure values and said flow rate values to achieve a target pressure for each said interface, said target pressures predetermined to provide maximum stiffness to said bearing interfaces without causing resonance in said interfaces;

adjusting pressure of said fluid at each said fluid entrance to equal said target pressures.

22. A method as in claim 21 wherein said computing step includes the step of dividing each said pressure value by said respective flow rate value to obtain an impedance value for each said interface.

23. A method as in claim 22 wherein said pressure adjusting step includes the step of increasing pressure in said respective interfaces until each said impedance value equals a predetermined maximum value above which resonance has been predetermined to occur.

24. A fluid bearing comprising:

a stator having a stator wall with at least one passageway with a first opening in a first surface of said stator wall and a second opening in a second surface of said stator wall;

a plurality of fluid channels in said second surface operably arranged to generate a hydrodynamic fluid bearing between said second stator surface and said moving surface;

said second openings being positioned such that each said passageway communicates with one of said at least one fluid channels;

a moving member having a moving surface proximal to and separated from said second surface by a space;

a plurality of fluid channels in said second surface operably arranged to generate a hydrodynamic fluid bearing between said second stator surface and said moving surface when fluid is admitted to said channels through said passages;

a housing mounted on said first surface with a port adapted such that a fluid from a source of fluid is enabled to flow through said port into said housing and first opening, through said at least one passage and into said space;

a means for controlling flow of fluid into said first opening through said passage;

said means for controlling mounted in said housing and having a valve surface facing said first opening that is moved toward said opening when flow in said passage is increased.

25. A fluid bearing as in claim 24 wherein:

said stator is a cylinder, said first surface being an outer surface of said cylinder and said second surface being an internal surface of said cylinder;

said moving member is a rotor inside said cylinder and said moving surface is a rotor surface of said rotor;

said at least one passageway being a plurality of passageways in which each said first opening of each said passageway lies on a common circular perimeter;

said means for controlling being a collar positioned around said perimeter of said cylindrical outer surface of said stator; said collar having an inner surface being said valve surface proximal to each said first opening of each said passageway;

said housing being mounted on said outer surface of said stator and enclosing said collar such that fluid entering said housing from said source flows around said collar, through said plurality of passageways and into space between said rotor surface and inner surface of said cylinder.

26. A fluid bearing as in claim 25 wherein:

said stator being a flat plate having said at least one passageway;

said moving member being a flat plate;

said means for controlling is a flap having one end secured to said first surface of said stator and a second end positioned over said first opening;

said housing being a housing block enclosing said flap and having a port for admitting fluid to said at least one passageway.

* * * * *